United States Patent

Nakajima et al.

[11] 4,435,485
[45] Mar. 6, 1984

[54] MAGNETIC RECORDING MEDIUM

[75] Inventors: Kaoru Nakajima, Izumi; Masashi Somezawa, Sendai; Minoru Takamizawa, Annaka; Yoshio Inoue, Annaka; Hiroshi Yoshioka, Annaka, all of Japan

[73] Assignee: Sony Corporation, Tokyo, Japan

[21] Appl. No.: 295,306

[22] Filed: Aug. 24, 1981

[30] Foreign Application Priority Data

Aug. 23, 1980 [JP] Japan .................. 55-116166

[51] Int. Cl.³ .............................................. H01F 10/02
[52] U.S. Cl. ................................. 428/694; 252/62.54; 427/128; 360/134; 360/135; 360/136; 428/900; 428/480
[58] Field of Search ................ 427/128; 428/480, 900, 428/694, 695; 360/134–136; 252/62.54; 204/159.16

[56] References Cited

U.S. PATENT DOCUMENTS

| | | | |
|---|---|---|---|
| 4,058,124 | 11/1977 | Yen et al. | 204/159.19 |
| 4,068,040 | 1/1978 | Yamada | 428/900 |
| 4,224,357 | 9/1980 | Iwai et al. | 427/54.1 |
| 4,260,466 | 4/1981 | Shirahata et al. | 204/192 M |
| 4,313,989 | 2/1982 | Suzuki et al. | 428/694 |
| 4,335,183 | 6/1982 | Hosaka | 428/694 |
| 4,368,242 | 1/1983 | Nakajima | 428/694 |

FOREIGN PATENT DOCUMENTS

| | | | |
|---|---|---|---|
| 51-911 | 1/1976 | Japan | 428/900 |
| 55-551639 | 1/1980 | Japan | 428/694 |
| 55-129933 | 10/1980 | Japan | 428/900 |

*Primary Examiner*—Ellis P. Robinson
*Attorney, Agent, or Firm*—Hill, Van Santen, Steadman & Simpson

[57] ABSTRACT

The magnetic recording medium contains the magnetic layer comprising the magnetic or magnetizable powders or particles and the binder comprising a composition containing (A) a compound represented by formula (V):

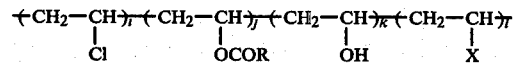

(wherein R is methyl or ethyl group and X is a group containing an acrylic or methacrylic double bond; i is a number in the range of approximately 200 to 800, j is a number in the range of approximately 10 to 200, k is a number in the range up to approximately 200, and l is a number in the range of approximately 3 to 100, provided that the division of l by the sum of k and l is in the range from approximately 0.2 to 1.0)

and (B) a compound having at least two acrylic and/or methacrylic double bonds in the molecule thereof and having a molecular weight ranging from approximately 1,000 to 6,000 in which the molecular weight in the molecule per one double bond is in the range from approximately 80 to 3,000.

The composition is cured by the irradiation of radiation so that the magnetic recording medium has an improved durability as well as physical strengths in the magnetic layer thereon.

7 Claims, No Drawings

MAGNETIC RECORDING MEDIUM

BACKGROUND OF THE INVENTION

1. Field of the Invention

The present invention relates to a magnetic recording medium having a magnetic layer containing mainly a magnetic or magnetizable powder and a binder.

2. Brief Description of the Prior Art

As a binder used for binding the magnetic or magnetizable powders to the supporting base for conventional magnetic recording medium such as magnetic tapes have been employed, for example, vinyl chloride-vinyl acetate-vinyl alcohol copolymers or such copolymers in which the hydroxyl groups are modified. Although these copolymers are cured irradiation so that complicated cross-linked structures are formed in the molecules or between the magnetic or magnetizable powders or particles and the binders, such copolymers are so inactive in the movement of the molecular chains at ambient temperatures that a sufficient or complete cure by the irradiation with radiations is effected.

Where low molecular weight oligoesters or oligourethanes are employed as binders and cured by the irradiating, the coatings before curing are so soft that adhesion to the base film is caused when they were wound onto a roll, whereby pinholes are caused on the coatings and sometimes a large amount of magnetic or magnetizable powders or particles coated on the base film are removed during the calender treatment.

OBJECTS AND SUMMARY OF THE INVENTION

Therefore, an object of the present invention is to provide a magnetic recording medium which can overcome or improve the disadvantages prevailing in the magnetic recording medium using the conventional binder or binders together with magnetic or magnetizable powders or particles.

Another object of the present invention is to provide a magnetic recording medium which has improved properties with respect to physical strengths and durability.

A further object of the present invention is to provide a magnetic recording medium having a magnetic layer in which a new binder having improved properties is employed.

In accordance with the present invention, there is provided a magnetic recording medium having a magnetic layer in which a binder having the general formula as will be described hereinbelow is employed.

DETAILED DESCRIPTION OF THE PREFERRED EMBODIMENTS

The binder to be employed in the magnetic recording medium according to the present invention may be composed of a composition composed of a compound (A) and a compound (B). The binder containing such composition is cured by irradiation. The compound (A) comprises components which may be each represented by the recurring units having the following general formulas:

Unit (I): 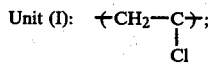

Unit (II): 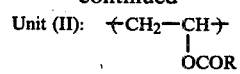

(wherein R is methyl or ethyl group);

Unit (III): 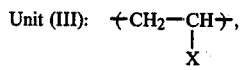

(wherein X is a group having an acrylic or methacrylic double bond).

The number of the recurring units as represented hereinabove as Unit (I) above which may be contained in the molecule of the compound may range from approximately 200 to 800. Likewise, the number of the recurring units as represented by Unit (II) above may be in the range from approximately 10 to 200, and the number of the recurring units as represented by Unit (III) may be in the range from approximately 3 to 100.

The polymer which is composed of the aforesaid polymer components as represented by Units (I) through (III) may contain optionally an additional unit as represented by the following recurring unit (IV):

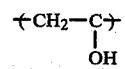

The number of the recurring units represented by Unit (IV) above which may be optionally added to the polymer compound may range up to approximately 200.

Accordingly, the polymer compounds to be employed for the magnetic recording media produced in accordance with the present invention may be briefly represented by the following general formula (V):

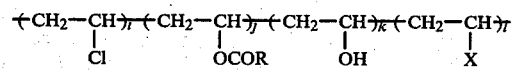

(wherein R and X have the same meanings as represented hereinabove, i is a number in the range of approximately 200 to 800, j is a number in the range of approximately 10 to 200, k is a number in the range up to approximately 200, and l is a number in the range of approximately 3 to 100, provided that the division of l by the sum of k and l is in the range from approximately 0.2 to 1.0).

It is to be noted herein that the order of the above components may be arbitrarily modified or changed according to the mode of reaction. It is thus to be understood that the general formula (V) merely indicates the whole picture of the components to be contained as a whole in the molecule of the compound used in accordance with the present invention, not the detailed structure of the compound.

More specifically, the symbol X indicated in the compounds represented by the above-mentioned general formula as Unit (III) may include, for example: —OCOCH=CH$_2$, —OCOC(CH$_3$)=CH$_2$ or the residue of a dicarboxylic acid.

The residue of the dicarboxylic acid as represented by the symbol X may be the residue of a reaction product of the dicarboxylic acid or a hydroxyacrylic acid or a hydroxymethacrylic acid. The dicarboxylic acid may include, for example, an aliphatic dicarboxylic acid, such as succinic acid, malonic acid, citric acid, oxalic acid, adipic acid, sebacic acid, azelaic acid and the like. The hydroxyacrylic and hydroxymethacrylic acid may be, for example, 2-hydroxyethylacrylic acid and 2-hydroxyethylmethacrylic acid. The residue of the reaction product of, for example, adipic acid with 2-hydroxyethylacrylic acid or with 2-hydroxyethylmethacrylic acid may be represented by the following formulas:

—OCO(CH$_2$)$_4$—COOC$_2$H$_4$OCOCH=CH$_2$ or

—OCO(CH$_2$)$_4$—COOC$_2$H$_4$OCOCH(CH$_3$)=CH$_2$.

These reaction products may be prepared by introducing chlorine atom into the reaction product obtainable by the reaction of the dicarboxylic acid with the acrylate or methacrylate to give the corresponding —COOCl compound and then eliminating hydrochloric acid from the reaction product for the introduction into the main polymer chain.

The polymer compounds represented as having the aforesaid recurring units may include, for example, ternary copolymers such as vinyl chloride-vinyl acetate-vinyl alcohol copolymers or such ternary copolymers in which the vinyl acetate components are partially or completely substituted by vinyl propionate components. In the compounds as represented by formula (V), it is preferred to have the hydroxyl groups in the scope ranging from approximately 20 to 100% acrylated or methacrylated. If the degree of acrylation or methacrylation is low beyond the lower limit, the density of cross-linking is rendered low. In this case, however, the use of the compound (B) which has a low molecular weight for its functional group, which will be described in detail hereinbelow, can compensate for the low degree of acrylation or methacrylation.

The compound (B) to be employed in accordance with the present invention may be a compound which has at least two acrylic or methacrylic type double bonds in the molecule thereof and which has a molecular weight ranging from approximately 1,000 to 6,000 in which the molecular weight in the molecule thereof per one double bond ranges from approximately 80 to 3,000. Such compounds may include, for example, low molecular weight acrylated or methacrylated oligoesters and oligourethanes. Such oligoesters may be polyacrylates or polymethacrylates of a polyhydric alcohol. In these acrylates and methacrylates, the term "poly" should be understood to mean to include di and higher. The polyhydric alcohols may include, for example, diols such as unsubstituted aliphatic diols, e.g., ethylene glycol, propane diol, butane diol, pentane diol, neopentyl glycol, hexane diol, heptane diol, octane diol, nonane diol, decane diol, dodecane diol, or the like; substituted aliphatic diols, e.g., 1-phenyl-1,2-ethane diol, 1,2-bis(4-pyridyl)-1,2-ethane diol, 3-chloro-1,2-propane diol, 2,2-diethyl-1,3-propane diol, 2-n-butyl-2-ethylpropane diol, 2,2-dimethyl-1,3-propane diol, 2,2-diphenyl-1,3-propane diol, 2-methyl-2-ethyl-1,3-propane diol, 2-amino-2-ethyl-1,3-propane diol, 2-amino-2-methyl-1,3-propane diol, 3-amino-1,2-propane diol, 3-mercapto-1,2-propane diol, 3-piperidino-1,2-propane diol, 2-(2-pyridyl)-1,3-propane diol, 2-methyl-1,4-butane diol, 1,1,4,4-tetraphenyl-1,4-butane diol, 2-methyl-2,4-pentane diol, 2,5-dimethyl-2,5hexane diol, 2-ethyl-1,3-hexane diol or the like; unsubstituted or substituted, unsaturated aliphatic diols, e.g., 2-butene-1,4-diol, 2,3-dibromo-2-butene-1,4-diol, 2-butyne-1,4-diol, 1,1,4,4-tetraphenyl-2-butyne diol, 3-hexene-2,5-diol or the like; unsubstituted or substituted, saturated or unsaturated alicyclic diols, e.g., 2,2,4,4-tetramethyl-1,3-cyclobutane diol, cyclohexane diol, 1,4-cyclohexane dimethanol, 3-cyclohexene-1,1-dimethanol, decalin diol or the like; unsubstituted or substituted aromatic diols, e.g., xylylene diol, di(beta-hydroxyethoxy)benzene, 1,5-dihydroxy-1,2,3,4-tetrahydronaphthalene, 2,3,5,6-tetramethyl-p-xylene-α,α'-diol, 1,1'-bi-2-naphthol, dihydroxynaphthalene, hydroxybenzyl alcohol, biphenol, 1,1'-methylenedi-2-naphthol, 1,1-bis(4-hydroxyphenyl)cyclohexane, bis(hydroxyphenyl)methane, catechol, 4-chlororesorcinol, hydroquinone, methylhydroquinone, hydroxybenzyl alcohol, alpha-(1-aminoethyl)- p-hydroxybenzyl alcohol, alpha-(1-aminoethyl)-p-hydroxybenzyl alcohol or the like; unsubstituted or substituted heterocyclic diols, e.g., N, N'-bis-(2-hydroxyethyl)piperazine or the like; acid or acid ester diols, e.g., 2,2-bis(hydroxymethyl)propionic acid, 3,4-dihydroxyhydrocinnamic acid or the like; dialcohol amines, e.g., diethanolamine, N-ethyl diethanolamine, N-n-butyl diethanolamine, N-(3-aminopropyl) diethanolamine or the like; other diols, e.g., polyethylene glycol, polypropylene oxide, polybutylene oxide, polycyclohexene oxide, polyethylene oxide, polypropylene oxide, polystyrene oxide, polyoxethane, polytetrahydrofuran, 1,3-bis(hydroxymethyl)urea or the like; triols, such as glycerol, trimethylolpropane, triethylolpropane, butane triol, 2-hydroxy-2-hydroxymethyl-1,3-propane diol, hydroxyresorcinol, 1,2,6-trihydroxyhexane, 1,2,4-benzen triol, pyrogallol, phloroglucinol, methyl 2,4,6- trrihydroxybenzoate, 2,2-bis(hydroxymethyl)-2,2',2''-nitrilotriethanol, triethanolamine or the like; tetraols such as diglycerol, pentaerythritol, sorbitan, meso-erythritol or the like; pentaols such as glucose or the like; hexaols such as dipentaerythritol, sorbitol or the like; and the like.

Preferred examples of the acrylic esters and methacrylic esters may be, for example, diacrylates such as ethylene glycol diacrylate, polyethylene glycol diacrylate, 1,3-propane diol diacrylate, 1,4-cyclohexane diol diacrylate, 1,5-pentene diol diacrylate, neopentyl glycol diacrylate and the like; dimethacrylates such as ethylene glycol dimethacrylate, diethylene glycol dimethacrylate, pentaerythritol dimethacrylate, diglycerol dimethacrylate and the like; triacrylates and trimethacrylates such as pentaerythritol triacrylate, 1,2,4-butane triol trimethacrylate, ethylene oxide-added trimethylol propane triacrylate, glycerol triacrylate, 1,2,4-butane triol trimethacrylate and the like; pentaacrylates and pentamethacrylates such as dipentaerythritol pentacrylate and the like.

Illustrative of the acrylamides or methacrylamides which may be employed as acrylic or methacrylic compounds may be, for example, methylene bisacrylamide, methylene bismethacrylamide and polyacrylamides and polymethacrylamides of ethylenediamine, diaminopropane, diaminobutane, pentamethylenediamine, hexamethylenediamine, bis(2-aminopropyl)amine, diethylenetriamine diamine, heptamethylenediamine, octamethylenediamine, polyamine interrupted by a hetero atom or atoms, cyclic polyamine such as phenylenediamine, xylylenediamine, beta-(4-aminophenyl)ethylamine, diaminobenzoic acid, diaminotoluene, diaminoanthraquinone or diaminofluorene or the like.

Compounds having two or more than two of different addition-polymeric unsaturated bonds, such as N-beta-hydroxylethyl-beta-(methacrylamido(ethylacrylate, N,N-bis(beta-methacryloxylethyl)acrylamide, allyl methacrylate and the like may be preferably employed as the acrylic and methacrylic compounds to be employed in accordance with the present invention.

Polyester copolymers having different degrees of polymerization may also be employed as the acrylic or methacrylic compounds in accordance with the present invention, which are the reaction product obtainable by the reaction of the monoacrylate or monomethacrylate and a diol with a dicarboxylic acid. The mono-acrylates and mono-methacrylates to be used for this purpose may preferably include, for example, trimethylolpropane monoacrylate or monomethacrylate. In place of the monoacrylate or monomethacrylate, there may also be used diacrylates or dimethacrylates of an aliphatic polyol such as pentaerythritol or the like or of an alicyclic diglycidyl esters or the like. The diols may include, for example, ethylene glycol, propylene glycol, 1,3-propane diol, 1,4-butane diol, 1,5-pentane diol, neopentyl glycol, diethylene glycol, dipropylene glycol, 2,2,4-trimethyl-1,3-pentane diol, 1,4-cyclohexane dimethanol, ethylene oxide adduct or propylene oxide adduct of bisphenol A or of hydrogenated bisphenol A, polyethylene glycol, polypropylene glycol, polytetramethylene glycol and other diols as have been illustrated hereinabove. In this case, a small amount of a triol and/or a tetraol may be added. The dicarboxylic acids to be employed may include, for example, an aliphatic dicarboxylic acid such as succinic acid, azelaic acid, sebacic acid, dodecane dicarboxylic acid or the like; an aromatic dicarboxylic acid such as adipic acid, terephthalic acid, isophthalic acid, orthophthalic acid, 1,5-naphthalic acid or the like; or an aromatic oxycarboxylic acid such as p-oxybenzoic acid, p-(hydroxyethoxy)benzoic acid or the like. Where the aromatic dicarboxylic acid is employed in admixture with the aliphatic acid, the molar ratio of the former to the latter may be preferably in the range from approximately 50/50 to 100/ca. 0. Where the aromatic dicarboxylic acid is employed in admixture with the other aromatic dicarboxylic acid, it is preferred to use terephthalic acid in the amount of at least about 30 mol%. A tri- and/or tetra-carboxylic acid may also be employed in admixture with the other carboxylic acid. Such tri- and tetra-carboxylic acids may include, for example, trimelittic acid, trimelissic acid, pyromelittic acid or the like.

Polyurethanes may also be employed, which may be prepared by reacting the monomethacrylate and a diol with a diisocyanate. The monoacrylates and monomethacrylates as well as the diol, together with the other ingredients with respect thereto, which may be employed for the preparation of the polyesters may also be employed for the preparation of the polyurethanes which also may be employed for this purpose. The diisocyanates may include, for example, aliphatic diisocyanates and aromatic diisocyanates such as tolylene diisocyanate and the like. The ratio of the acrylates and/or the methacrylates to the polyols may vary with the kinds of the acrylates or methacrylates. Where the monacrylates or monomethacrylates are employed as the acrylate or methacrylate components, the molar ratio of the monoacrylates and/or monomethacrylates to the polyols may range from approximately 80:20 to 10:90. Where the acrylates or methacrylates are the diacrylates or dimethacrylates, the molar ratio of the diacrylates or dimethacrylates to the polyols may be in the range from approximately 40:60 to 5:95.

The oligourethanes to be employed as the compound (B) are urethanes obtainable by reacting the aforesaid polyols with the diisocyanate such as toluene diisocyanate or 1,6-hexane diisocyanate and then reacting the resulting polyisocyanates with acrylates or methacrylates such as 2-hydroxyethyl acrylate or methacrylate, 2-hydroxypropyl acrylate or methacrylate, or the like.

The compositions to be employed as the binders in accordance with the present invention contain the compound (A) in the amount ranging from approximately 20 to 80% by weight and the compound (B) in the amount ranging from approximately 80 to 20% by weight. Where the concentration of the compound (A) is far beyond the upper limit, the cross-linking with the compound (B) is not enough so that flexibility and durability such as abrasive resistance are impaired. Where the concentration of the compound (A) is too low, problems with respect to pinholes and the rubbing-off of the magnetic or magnetizable powders or particles from the magnetic layer are encountered.

It can be noted that the compounds (A) to be employed as one of the components of the binder, such as vinyl chloride-vinyl acetate-vinyl alcohol copolymers, are those in which the hydroxyl groups are modified or substituted by the groups having the acrylic or methacrylic double bond as represented by the symbol X above, can provide a considerable high density of cross-linked structures by irradiation so that they may be employed themselves as suitable binders for magnetic recording media applicable in wide ranges of temperatures or humidity. However, as have been set forth hereinabove, such compounds cannot be cured completely by the irradiation. In accordance with the present invention, as have been apparent from the description hereinabove, the compound (A) is employed in admixture with the compound (B) having the low molecular weight in the predetermined molar ratio so that a desired density of cross-linked structures formed by the irradiation can be provided. It is considered that the compound (B) which may be readily mobile because of its low molecular weight enters the molecular skeletons of the compound (A) so that the reaction between the two compounds is easily effected. The use of the compound (A) in admixture with the compound (B) can also effectively prevent the problems with pinholes and removal or rubbing-off of the magnetic layer which may be encountered in the sole employment of the compound (B) as the binder.

The magnetic powders or magnetizable particles used in magnetic recording mediums produced in accordance with the present invention may be composed of any available magnetic or magnetizable material, such as gamma hematite (gamma-$Fe_2O_3$); magnetite ($Fe_3O_4$); gamma hematite or magnetite doped with non-ferrous atoms, such as cobalt; iron oxides of non-stoichiometric oxidation compounds between gamma hematite and magnetite; chromium dioxide ($CrO_2$); magnetic or magnetizable alloys, such as an iron-cobalt alloy (Fe-Co), iron-cobalt-nickel alloy, such alloys containing a further non-metallic element or a metallic element such as a transition metal element, or the like; mixtures of the above or other magnetic or magnetizable materials.

Magnetic recording media produced in accordance with the present invention may also contain antistatic agents of the type conventionally used with magnetic recording media. An example of a suitable antistatic agent is carbon black but other suitable antistatic agents may also be used. Further, dispersing agents, such as lecithin and the like, may be added to a magnetic layer of a magnetic recording medium in accordance with the conventional practice. An abrasive material, such as aluminum oxide, chromium oxide or silicon oxide may also be employed. Furthermore, the magnetic layer on the magnetic recording medium may contain a lubricant, such as molybdenum disulfide, graphite or silicone oil.

The non-magnetic supporting material or base to be used for the magnetic recording medium in accordance with the present invention may be a conventional one and may include, for example, polyesters such as polyethylene terephthalate; polyolefins such as polypropylene, cellulose derivatives such as cellulose triacetate or cellulose diacetate; polycarbonates, polyvinyl chlorides, polyimides, metals such as aluminum or copper; and fibrous materials such as papers.

The magnetic recording medium produced in accordance with the present invention may be produced by irradiating with suitable radiation after the compound as represented hereinabove, together with the magnetic or magentizable powders or particles and other components for the magnetic layer, is coated on the non-magnetic supporting material. The radiations suitable for being irradiated on the magnetic layer may be, for example, electron rays, neutron rays, gamma rays and the like. The dose of the radiations may range preferably from approximately 1 to 10 Mrad and more preferably from approximately 2 to 7 Mrad. The energy of irradiation may be above approximately 100 KeV. The mode of irradiating may be a conventional one.

The magnetic recording media in accordance with the present invention may comprise any of the known forms, such as magnetic recording tapes having a flexible non-magnetic film, discs having a relatively rigid non-magnetic base such as composed of a ceramic or a metal, for example, aluminum.

The compound (A) to be employed as one of the components of the composition may be prepared as follows:

A reaction flask equipped with a stirrer, a thermometer, a reflux condenser and a dropping funnel was charged with 660 grams of toluene and 1,000 grams of methylisobutylketone and the mixture was heated to 40° C. To this mixture were added, with stirring, 225 grams of vinyl chloride-vinyl acetate-vinyl alcohol copolymer comprising 89.2 mol% of the vinyl chloride component, 2.3 mol% of the vinyl acetate component and 8.5 mol% of the vinyl alcohol component and having an average polymerization degree of 430 and dissolved therein. To this solution were added 33.3 grams of triethylamine and then 25.1 grams of methacrylic chloride were dropwise added thereto. As the dropwise addition started reaction, triethylamine hydrochloride precipitated out. After the reaction was continued for 2 hours at 60° C. thereafter, the temperature was raised to 110° C. or higher and excess triethylamine was distilled off. After cooling, the removal of the precipitated triethylamine hydrochloride by filtration gave 1,554 grams of a pale yellow transparent liquid. To this solution was added methanol thereby precipitating out the copolymer product which gave, after purification, a pale yellow gummy material. This material was confirmed by infrared absorption spectrum, nuclear magnetic resonance and elementary analysis, as the copolymer containing the components having the following formula:

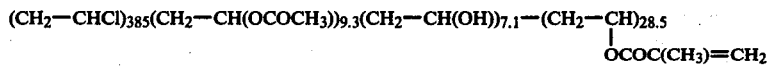

The present invention will be described more in detail by way of working examples.

EXAMPLE 1

A magnetic tape was prepared using a magnetic paint having the following composition:

| Composition | Weight (parts by wt.) |
| --- | --- |
| Compound A | 80 |
| Compound B | 20 |
| gamma-Fe$_3$O$_3$ | 300 |
| Lecithin | 3 |
| Squalene | 9 |
| Cr$_2$O$_3$ | 3 |
| Methylethylketone | 500 |
| Methylisobutylketone | 500 |

(Note)
The compound A is vinyl chloride-vinyl acetate-vinyl alcohol prepared hereinabove. The compound B is an oligourethane methacrylate prepared by reacting 1 mole of trimethylolpropane with 3 moles of toluene diisocyanate and then with 3 moles of 2-hydroxyethyl acrylate.

The magnetic paint having the above composition was coated on a polyethylene terephthalate base film having a thickness of 16 microns. After drying and calendering under 40 kg/cm at 80° C., the electron rays were irradiated thereon at 5 Mrad under an accelerating voltage of 200 KV and then cut into a half inch wide pieces.

EXAMPLE 2

A magnetic tape was prepared in the same manner as in Example 1 with the exception that the compound A was used in the amount of 50 parts by weight and the compound B was in the amount of 50 parts by weight.

EXAMPLE 3

A magnetic tape was prepared in the same manner as in Example 1 with exception that the compound A was in the amount of 20 parts by weight and the compound B was in the amount of 80 parts by weight.

COMPARATIVE EXAMPLE 1

A magnetic tape was prepared in the same manner as in Example 1 with the exception that, in the place of the compound A, the compound A modified so as to provide a degree of methacrylation of 80% was employed in the amount of 100 parts by weight and the Compound B was not used.

COMPARATIVE EXAMPLE 2

A magnetic tape was prepared in the same manner as in Example 1 with the exception that the compound B of Example 1 was employed in the amount of 100 parts by weight and no compound A was employed.

The magnetic tapes prepared hereinabove were tested for their characteristics with respect to the endurance time (hours) and percent extraction with solvent (%). The percent extraction with solvent was calculated by dividing by the total charged amount of binders the amount obtained by deducting the charged amounts of lecithin and squalene from the total extraction amount obtained by the Soxhlet extraction method. The results are shown in the table below:

TABLE

| Examples | Percent Extraction with Solvent (%) | Endurance time (hr) |
|---|---|---|
| Example 1 | 5.2 | 5.1 |
| Example 2 | 7.6 | 7.6 |
| Example 3 | 11.5 | 11.5 |
| Comparative Example 1 | 14.3 | 0.8 |
| Comparative Example 2 | 3.2 | 9.7 |

It is to be noted that the magnetic tapes prepared in Examples 1 through 3 had favorable overall characteristics. The magnetic tape of Comparative Example 2 gave a fovorable percent extraction; however, adhesion between the magnetic layer surface and the back surface of the base film during storage on a roll and, in some worst cases, a large area of the magnetic layer was peeled off with a large number of small pinholes observed. A similar observation was made when a copolymer compound having a methacrylation degree of 40% was employed with substantially the same results.

What is claimed is:

1. A magnetic recording medium having a magnetic layer comprising magnetic or magnetizable powders or particles and a binder comprising a composition containing (A) a compound having components represented by recurring units having the following formulas:

Unit (I): 

Unit (II): 

(wherein R is methyl or ethyl group);

Unit (III): 

(wherein X is a group consisting an acrylic or methacrylic double bond); and,

Unit (IV): 

in which the number of recurring units represented as Unit (I) ranges from approximately 200 to 800; the number of recurring units represented by Unit (II) ranges from approximately 10 to 200; the number of recurring units represented by Unit (III) ranges from approximately 3 to 100; and the number of recurring units represented by Unit (IV) is optionally in the range up approximately 200; and (B) a compound having at least two acrylic and/or methacrylic double bonds in the molecule thereof and having a molecular weight ranging from approximately 1,000 to 6,000 in which the molecular weight in the molecule thereof per one double bond is in the range from approximately 80 to 3,000; and said composition used as the binder is cured by irradiation and wherein the composition comprises the compound (A) in the amount ranging from approximately 20 to 80% and the compound (B) in the amount ranging from approximately 80 to 20%.

2. A magnetic recording medium according to claim 1, wherein the compound (A) is represented by formula (V):

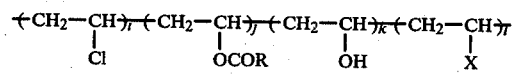

(wherein R and X have the same meanings as represented hereinabove, i is a number in the range of approximately 200 to 800, j is a number in the range of approximately 10 to 200, k is a number in the range up to approximately 200, and l is a number in the range of approximately 3 to 100, provided that the division of l by the sum of k and l is in the range from approximately 0.2 to 1.0).

3. A magnetic recording medium according to claim 1, wherein the compound (A) is a vinyl chloride-vinyl acetate-vinyl alcohol modified so as to provide a methacrylation degree of 40% or 80% and the compound (B) is an oligourethane methacrylate obtained by reacting 1 mole of trimethylolpropane with 3 moles of toluene diisocyanate and then with 3 moles of 2-hydroxyethyl acrylate.

4. A magnetic recording medium according to claim 1, wherein the composition is cured by irradiation in the amount ranging from approximately 1 to 10 Mrad.

5. A magnetic recording medium according to claim 4, wherein the amount of radiation ranges from approximately 2 to 7 Mrad.

6. A magnetic recording medium according to claim 2 wherein the composition is cured by irradiation in an amount ranging from approximately 1 to 10 Mrad.

7. A magnetic recording medium according to claim 3 wherein the composition is cured by irradiation in an amount ranging from approximately 1 to 10 Mrad.

* * * * *

UNITED STATES PATENT AND TRADEMARK OFFICE
CERTIFICATE OF CORRECTION

PATENT NO. : 4,435,485
DATED : March 6, 1984
INVENTOR(S) : Kaoru Nakajima et al

It is certified that error appears in the above—identified patent and that said Letters Patent is hereby corrected as shown below:

On the title page

Change the assignee to read:

-- SONY CORPORATION AND SHIN-ETSU CHEMICAL CO., LTD.

both of Tokyo, Japan. --.

Signed and Sealed this

Twenty-seventh Day of September, 1988

*Attest:*

DONALD J. QUIGG

*Attesting Officer*   *Commissioner of Patents and Trademarks*